United States Patent [19]
Asari et al.

[11] Patent Number: 6,031,470
[45] Date of Patent: Feb. 29, 2000

[54] METHOD AND DEVICE FOR TRANSMITTING KEY OPERATION INFORMATION AND TRANSMISSION-RECEPTION SYSTEM

[75] Inventors: Naosuke Asari, Chiba; Koji Takashima, Tokyo; Masanori Ishigaki, Kanagawa; Toshihisa Ueki, Aichi, all of Japan

[73] Assignees: Sony Corporation; Sony-Kihara Research Center, Inc., both of Tokyo, Japan

[21] Appl. No.: 08/981,978

[22] Filed: Jan. 9, 1998

[30] Foreign Application Priority Data

May 10, 1996 [JP] Japan ................................. 8-139779

[51] Int. Cl.[7] ............................................. H04B 10/00
[52] U.S. Cl. .......................... 341/22; 341/126; 359/142; 345/168; 455/151.2
[58] Field of Search ................................. 341/22, 31, 176; 345/166, 168, 170, 175; 455/151.1, 151.2, 179.1, 185.1, 186.1, 186.2; 359/142, 146, 148

[56] References Cited

U.S. PATENT DOCUMENTS

| | | | |
|---|---|---|---|
| 5,189,543 | 2/1993 | Lin | 359/142 |
| 5,289,543 | 2/1994 | Leibman | 381/7 |
| 5,410,305 | 4/1995 | Barrus | 341/22 |
| 5,515,051 | 5/1996 | Tanaka | 341/174 |
| 5,615,393 | 3/1997 | Kikinis | 341/32 |
| 5,729,220 | 3/1998 | Russell | 341/22 |
| 5,737,107 | 4/1998 | Umeda | 359/146 |
| 5,818,437 | 10/1998 | Grover | 345/326 |
| 5,859,599 | 1/1999 | Shiga | 341/21 |
| 5,861,822 | 1/1999 | Park | 341/22 |

*Primary Examiner*—Michael Horabik
*Assistant Examiner*—Albert K. Wong
*Attorney, Agent, or Firm*—Frommer Lawerence & Haug, LLP; William S. Frommer

[57] ABSTRACT

An IR keyboard 1 generates key code information corresponding to key operated to add break flag information indicating distinction between in-operation and operation release to the key code information as operation status information of the key to add terminator code information indicating that the key code information corresponding to key operation every once is completed to the last portion of the key code information to transmit, as key operation information, the key code information, the break flag information and the key code information by an infrared ray signal from a light emitting unit 11. Further, a light receiving unit 2 receives the infrared ray signal transmitted from the light emitting unit 11 to input key operation information of the IR keyboard 1 to a computer unit 3. At the light receiving unit 2, a control is conducted such that in the case where receive signal is ceased to be received in the state where break flag information added to key code information included in the infrared ray signal transmitted from the light emitting unit 11 of the IR keyboard 1 indicates that the key is being operated, when clocking operation starts from the time point of occurrence of fault and a receive signal can be obtained within a predetermined time, the receive signal is considered to be continuously received.

7 Claims, 10 Drawing Sheets

| KEY NO. | MARKING | CODE |
|---|---|---|
| 1 | ESC | 01 |
| 2 | 1 ! ぬ | 02 |
| 3 | 2 " ふ | 03 |
| 4 | 3 # あ | 04 |
| 5 | 4 $ う | 05 |
| 6 | 5 % え | 06 |
| 7 | 6 & お | 07 |
| 8 | 7 ' や | 08 |
| 9 | 8 ( ゆ | 09 |
| 10 | 9 ) よ | 0A |
| 11 | 0 ~ わ | 0B |
| 112 | F1 | 70 |
| 113 | F2 | 71 |
| 114 | F3 | 72 |
| 115 | F4 | 73 |
| 116 | F5 | 74 |
| 117 | F6 | 75 |
| 118 | F7 | 76 |
| 119 | F8 | 77 |
| 120 | F9 | 78 |
| 121 | F10 | 79 |
| 122 | F11 | 7A |
| 123 | F12 | 7B |
| 124 | PrintScreen | 7C |
| 125 | ScrollLock | 7D |
| 126 | Pause | 7E |
| 127 |  | 7F |

FIG.3

DATA STRUCTURE OF PACKET

FIG.4

STRUCTURE OF DATA BLOCK FORMING DATA AREA

FIG.5

FIG.6 DATA STRUCTURE AT TIME OF SINGLE KEY OPERATION

FIG.7

DATA STURUCTURE AT TIME OF PLURAL KEY OPERATION

METHOD AND DEVICE FOR TRANSMITTING KEY OPERATION INFORMATION AND TRANSMISSION-RECEPTION SYSTEM

FIELD OF THE INVENTION

This invention relates to an apparatus and method for transmitting and receiving signals of key operation information from a keyboard. The invention is applied to a transmitting/receiving system of key code information. The system comprises a keyboard for transmitting key operation information by, e.g., wireless means and a computer, etc. capable of carrying out processing operations on the basis of a signal transmitted from the keyboard.

BACKGROUND OF THE INVENTION

It is widely known that keyboards are used as input devices for computers, etc. It is known that keyboards can be adapted to transmit operation information of the keyboard by wireless means using an infrared ray signal, etc. In a wireless keyboard, a receiving unit on the computer such as an infrared ray receiving unit, etc. receives a signal transmitted from the wireless keyboard and executes processing that corresponds to the key operation information of the received signal.

There is a need to increase the kind of operations that a keyboard of limited size can handle. Measures to increase the use of many keys have been limited. In wireless keyboards, the simultaneous operation of about two to four keys is allowed at most. Simultaneous operations of more than two to four operations has heretofore been impossible.

An IR (Infra-Red) keyboard transmits operation information of a key by infrared rays. A transmit signal can be temporarily interrupted by any disturbance. For example, a human being or object passing between the light emitting unit of the infrared rays of the IR keyboard and the receiving unit. In such a case of disturbance, although key operation is successively carried out at the IR keyboard side, it is judged at the receiving side (e.g., computer side) that the key operation has been completed when the receive signal is cut off by interruption of the signal. This disturbance creates problems. For instance, interruption of the transmit signal, display, etc. of characters or ruled lines, etc. which have been inputted in accordance with the keyboard operation might uselessly overlap, or become missing or the like. So inconveniences are apt to take place wherein the computer of the receiving side fails to cope with the primary key operation that the keyboard user is carrying out.

In view of the above, an object of this invention is to provide an apparatus and method for transmitting signals from a wireless keyboard wherein said apparatus is capable of realizing a wide variety of key operation forms (modes) based on simultaneous operation of a large number of keys.

A further object of this invention is to provide an apparatus and method for transmitting signals from a wireless keyboard wherein there is less possibility of an erroneous operation because of an interruption of the transmit signal.

DETAILED DESCRIPTION OF THE INVENTION

According to this invention, a method for transmitting key operation information comprises the steps of: generating key code information corresponding to a key operated; adding break flag information indicating a distinction between the operation status of "in operation" or "operation release" in the key code information, adding terminator code information indicating that the key code information corresponding to the key operation is completed to the last portion of the key code information to which the break flag information has been added; and transmitting, as key operation information, the key code information, the break flag information and the key code information.

In accordance with the transmitting method for key operation information according to this invention, e.g., the key operation information is transmitted in packet units. Moreover, in the transmitting method for key operation information according to this invention, the key operation information may include, e.g., code information of multiple key codes simultaneously operated and break flag information added to the respective key code information.

A transmitting apparatus for transmitting key operation information according to this invention comprises: means for generating key operation information corresponding to a key operated, means for adding break flag information indicating the operation status of the key as either in-operation or operation release, means for adding terminator code information indicating that the key code information corresponding to key operation is completed to the last portion of the key code information to which the break flag information has been added; and transmitting means for transmitting, as a transmit signal, the key operation information generated by the key operation information generating means.

In the transmitting apparatus for key operation information according to this invention, the transmitting means is of a structure comprising, e.g., infrared ray transmitting means for transmitting and outputting the transmit signal as an infrared ray signal.

A transmitting/receiving system for key operation information according to this invention comprises: a transmitting unit for generating key code information corresponding to a key operated, means for adding break flag information indicating the operation status of the key as either in-operation or operation release, means for adding terminator code information indicating that the key code information corresponding to key operation is completed to the last portion of the key code information to which the break flag information has been added, transmitting the key code information, the break flag information and the key code information as key operation information; and a receiving unit comprising means for receiving the key operation information transmitted from the transmitting unit, whereby the receiving unit conducts a control process when a receive signal stops being received in the state where the break flag information added to the key code information included in that received signal indicates that key is being operated, a clocking operation starts from the time point of occurrence of that failure and a receive signal can be obtained within a predetermined time, the receive signal is considered to be continuously received.

In the transmitting/receiving system for key operation information according to this invention, the receiving control means carries out a control such that in the case where, e.g., the receive signal cannot be obtained at the time point when a predetermined time is passed by the clocking operation, it outputs a key operation end information signal indicating transmission end of transmit signal corresponding to the key operation.

BEST MODE FOR CARRYING OUT THE INVENTION

The best mode for carrying out this invention will now be described in detail with reference to the attached drawings.

Figure 1:
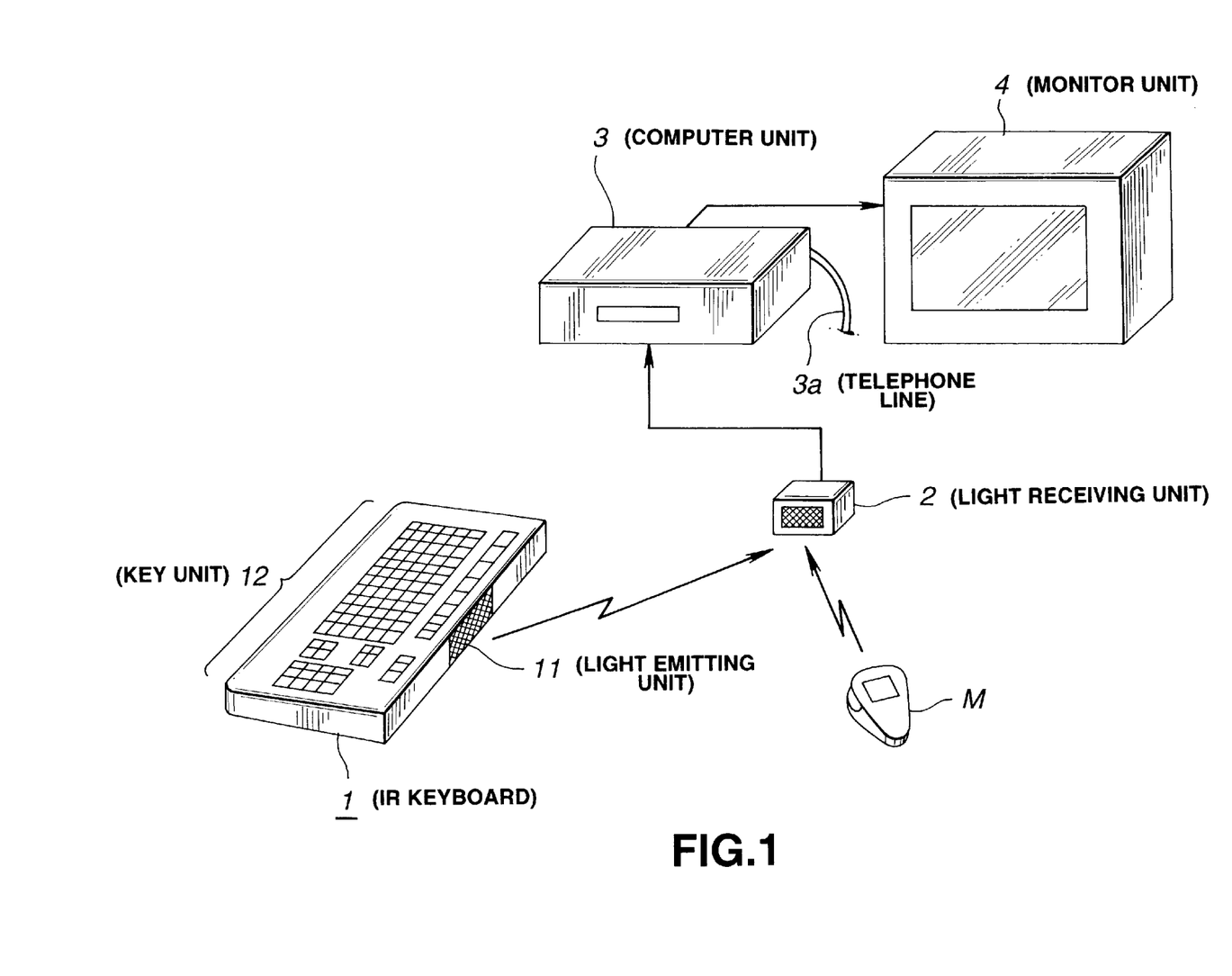
FIG. 1 is a view showing, in a model form, the configuration of a transmitting/receiving system to which this invention is applied.

This invention is applied to a transmitting/receiving system having a configuration as shown, for example, in FIG. 1.

The transmitting/receiving system shown in FIG. 1 comprises an IR keyboard 1 with a light emitting unit 11 for transmitting key operation information as an infrared ray signal, a light receiving unit 2 for receiving the infrared ray signal transmitted from the light emitting unit 11, a computer unit 3 supplied with key operation information of the IR keyboard 1 through the light receiving unit 2, and a monitor unit 4 connected to the computer unit 3.

The IR keyboard 1 is provided with a key unit 12 in which multiple operation keys are disposed at the upper surface panel portion thereof. A light emitting unit 11 is provided on the back portion thereof. Key operation information corresponding to various key operations of the key unit 12 are transmitted from the light emitting unit 11 as infrared ray signals having a carrier frequency of 455 kHz.

The light receiving unit 2 receives the infrared ray signal transmitted from the light emitting unit 11 of the IR keyboard 1 to decode it and to deliver a key code signal corresponding to the key operation to the computer unit 3. In this example, the light receiving unit 2 is separate from the computer unit 3. The receiving unit is connected to the computer unit 3 by a connector cable. The receiving unit may be included within the computer unit 3.

The computer unit 3 has the function of being a disc player which can widely reproduce various disc media, e.g., CD-ROM, Video CD, Photo CD, CD-DA (Digital Audio) or CD-plus, etc. In addition, the computer unit 3 has communication functions for carrying out computer communication such as Internet access, etc. by making connection to the telephone circuit via a telephone line 3a.

A user can view or listen to reproduced pictures or sounds in this computer unit 3 by, e.g., monitor unit 4 or audio system (not shown). Moreover, in this computer unit 3, a GUI (Graphical User Interface) is employed. In operation for reproduction, etc., of the disc media or at the time of utilization of the Internet, a graphic and/or icon, etc. are displayed on the monitor unit 4. Thus, the user operates the IR keyboard 1 or a mouse M, etc. while looking at a graphic on the screen of the monitor unit 4 to thereby carry out operation of the computer unit 3.

Figure 2:
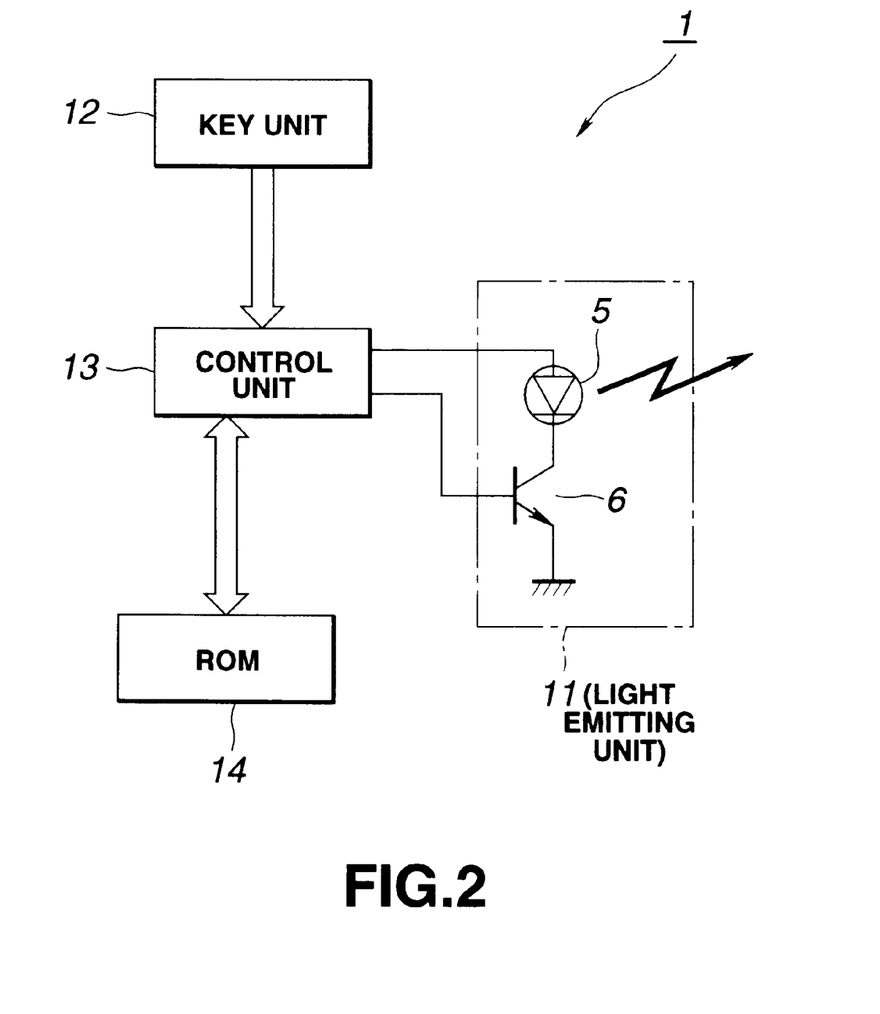
FIG. 2 is a block diagram showing the internal configuration of an IR keyboard which is the transmitting unit in the transmitting/receiving system.

The IR keyboard 1 as shown in the block diagram of FIG. 2 comprises a key unit 12, a control unit 13, a ROM 14 and a light emitting unit 11.

In the IR keyboard 1, a signal indicating that a key has undergone a pressing (pushing-down) operation is delivered from the key unit 12 to the control unit 13 in a time divisional manner. The control unit 13 reads out, from the ROM 14, the key code corresponding to the key which has been pushed down on the basis of the signal delivered from the key unit 12. A transmit signal is generated for transmitting the key code on the basis of a transmission format which will be described later. Further, in the light emitting unit 11, a transistor 6 undergoes ON/OFF control on the basis of the transmit signal, whereby either the light emitting state of a LED 5 is on or off. When ON an infrared ray signal indicating the key code corresponding to the key operation information is transmitted from the light emitting unit 11.

Figure 3:
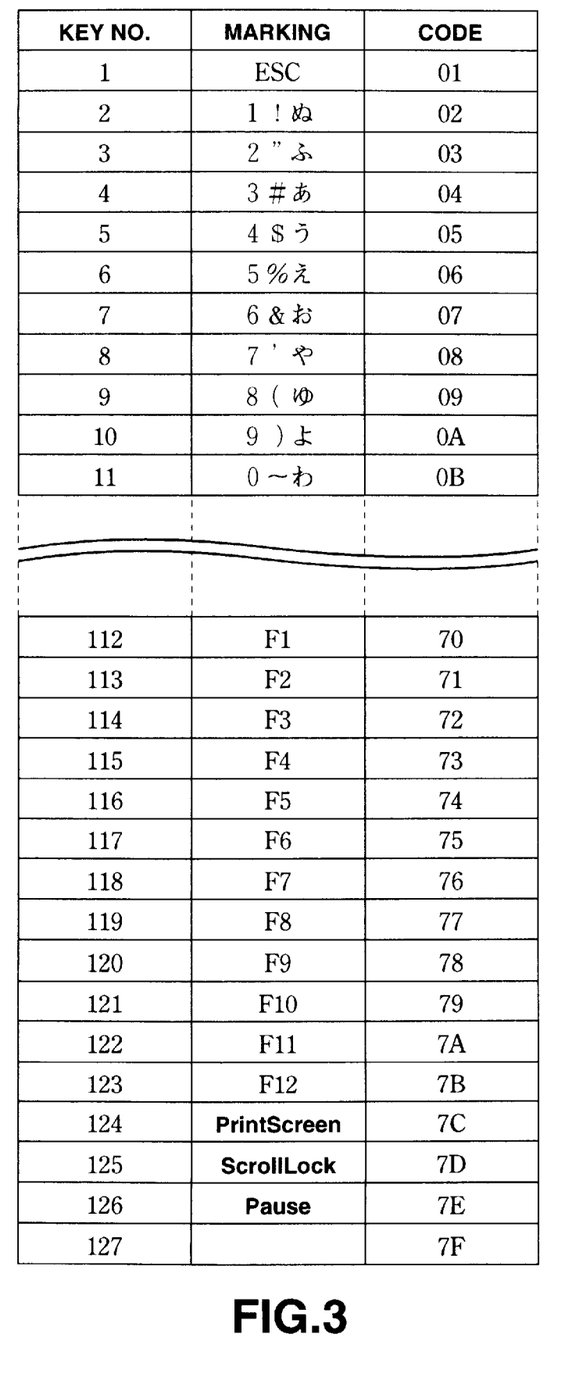
FIG. 3 is an explanatory view showing correspondence between keys and key codes of the IR keyboard.

Data, etc., of the key code corresponding to the key operation information delivered from the key unit 12 is stored in the above-described ROM 14. An example of the setting of this key code data is shown in FIG. 3. In FIG. 3, an example of the settings of key code data for a Japanese keyboard is shown.

In FIG. 3, key numbers 1 thru 127 are indicated in the left column, characters/symbols marked on the key tops of operation keys corresponding to respective key numbers are indicated in the central column, and key codes corresponding to keys of respective key numbers and respective marked characters/symbols are indicated in the right column by the hexadecimal notation.

An example of the setting of key code data in FIG. 3 mentioned above would be that when the user presses down the key marked "ESC" the control unit 13 reads out the key code "01" stored at the address of key number 1 from the ROM 14. The key code is transmitted in accordance with the transmission format.

The format of the transmit signal transmitted by the IR keyboard 1 which is the transmitting unit according to this invention will now be described with reference to FIGS. 4 to 7.

Figure 4:
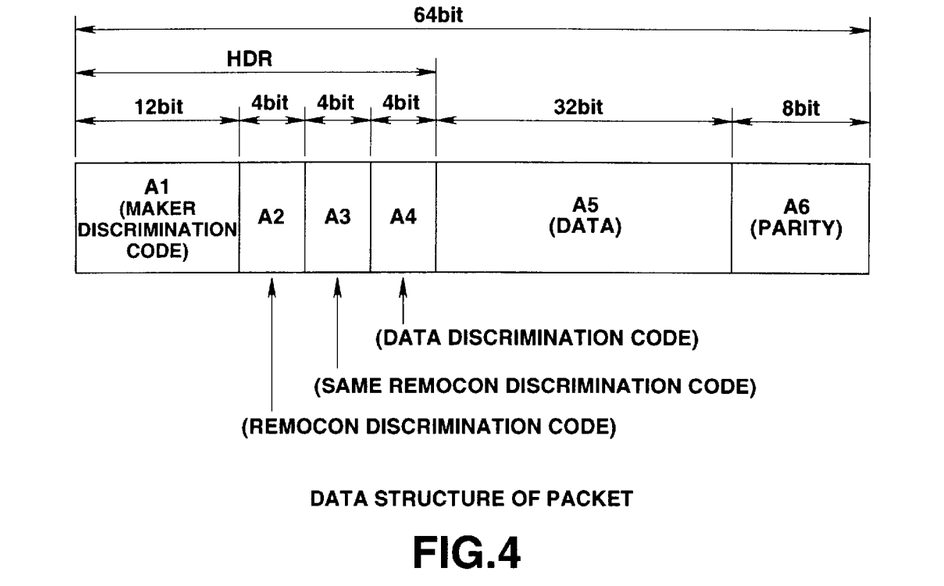
FIG. 4 is a view showing the data structure of a packet of information in the transmitting/receiving system.

The infrared ray signal from the light emitting unit 11 of the IR keyboard 1 is transmitted by fixed length units of data called packets. The data structure of a packet is shown in FIG. 4. As shown in FIG. 4, one packet has a length of 64 bits. The packet consists of a header portion HDR consisting of maker discrimination code area A1, a remocon (remote control) discrimination control area A2, another remocon discrimination code area A3 and data discrimination code area A4. A data area A5 and parity area A6 make up the remainder of the packet.

The maker discrimination code area A1 (12 bits) is the area in which code for determining (identifying) the maker of the remote controller (hereinafter simply referred to as remocon) is set. The remocon discrimination code area A2 (4 bits) succeeding (subsequent) to the maker discrimination code area A1 is the area of code for determining the kind of remocons at the same maker. The remocon discrimination code area A3 (4 bits) also is the area for code which discriminates the same kind of remocon. The data discrimination code area A4 (4 bits) is the code area for determining the kind of data in the data area. In these respective areas, codes are given in accordance with the manufacturing maker, the type of IR keyboard actually used, and the kind of data based on the transmission format, etc. In this example, the code data is stored in advance in the ROM 14.

The data area A5 (32 bits) is the area in which data of key codes, indicating respective keys operated, are assigned. The last parity area A6 (8 bits) is the area for parity data.

Data area A5 consists of 32 bits as shown in FIG. 4. Data area A5 is formed by three data blocks of which each block has 8 bits as shown in FIGS. 5(a), (b) and (c).

Figure 5:
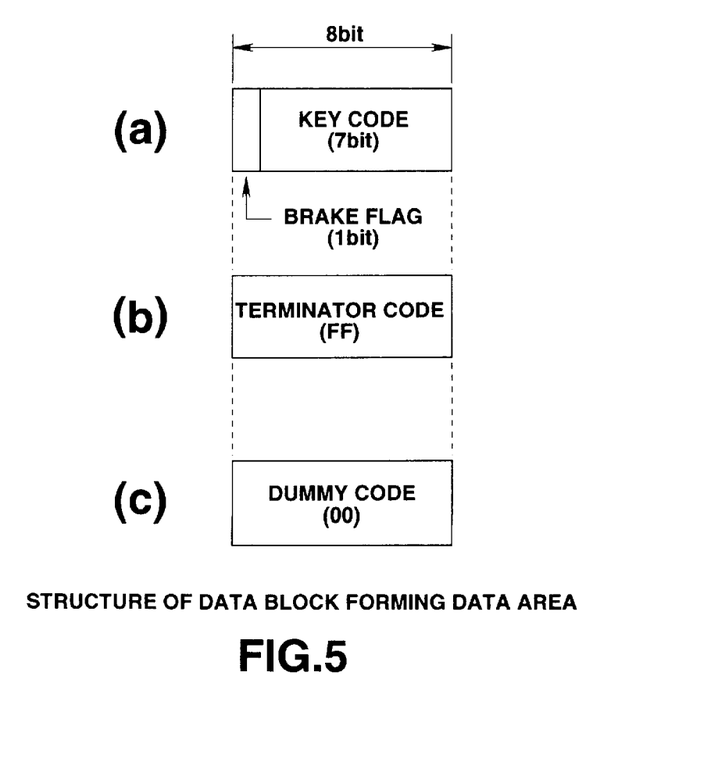
FIG. 5 is a view showing a data block which forms the data area of a packet.

The first data block shown in FIG. 5(a) consists of a 1 bit break flag followed by a 7 bit key code. The 7 bit key code area (see FIG. 3) indicates the key which has been pressed down. The break flag is set to "0" during the pressing (pushing-down) operation of the key. The break flag is set to "1" during the operation release of the key.

Terminator code is shown in FIG. 5(b). The terminator code is for indicating the termination of one or multiple key codes which have been considered to be pressed (pushed down) at present. The terminator code, "FF" is set by a hexadecimal notation as shown in FIG. 5(b), for example.

Dummy code is shown in FIG. 5(c). The dummy code is used when there is any excess area after the terminator code within the data area A5 of any one packet. The dummy code, "00" is set by the hexadecimal notation as shown in FIG. 5(c), for example.

Figure 6:
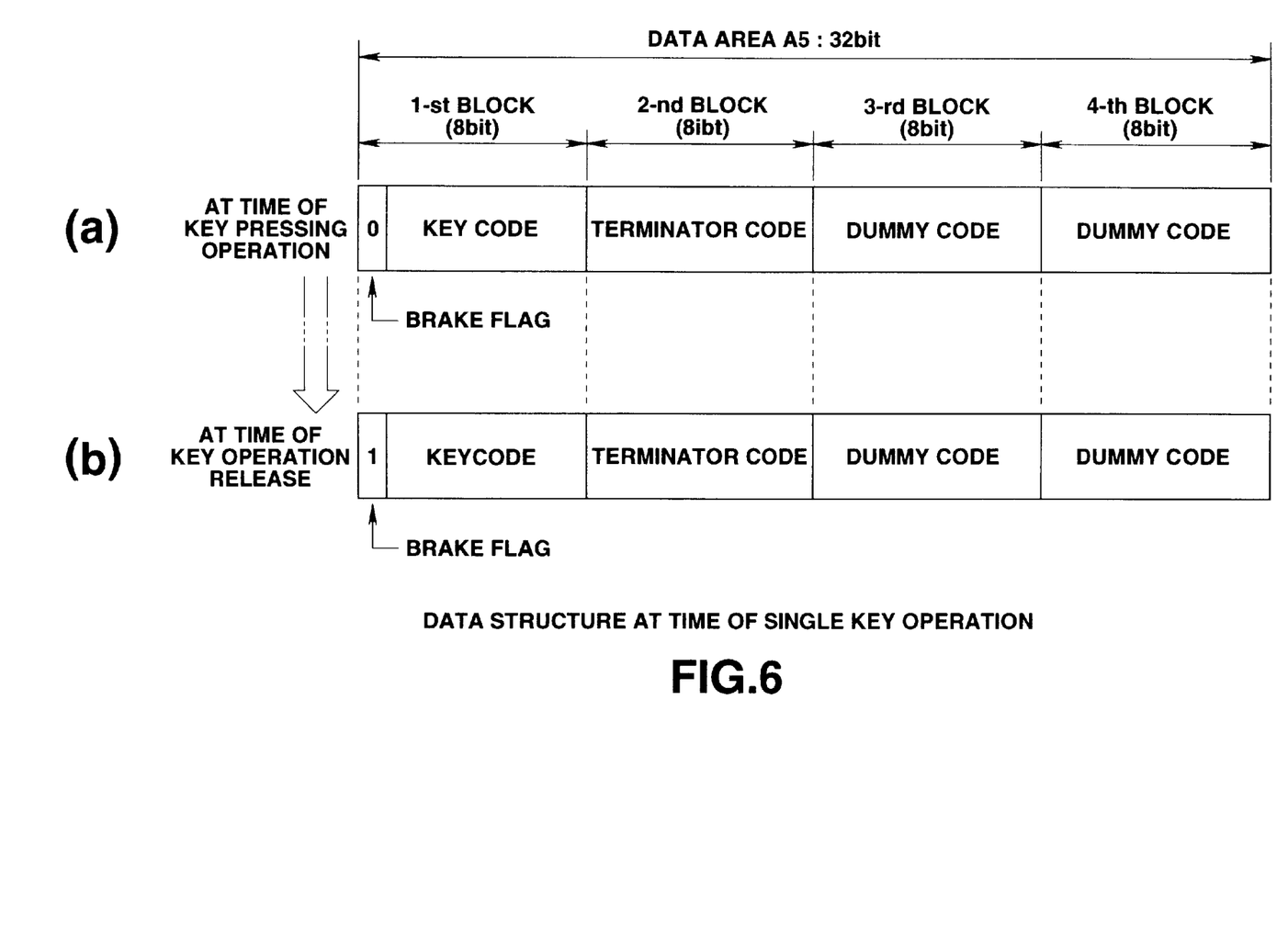
FIG. 6 is a view showing the data structure of a transmit signal when a single key is operated in the transmitting/receiving system.

With references to FIG. 6, an explanation is now given in connection with the data structure obtained when a single key is operated on the basis of the transmission format described above. It is to be noted that, in FIG. 6, only the data area A5 of the data structure of one packet shown in FIG. 4 is indicated. The other areas of the data structure are omitted.

When the user operates, e.g., one (single) key on the IR keyboard 1, a key code with a break flag is set at the first block of the first 8 bits in the data area A5 of the 32 bits as shown in FIG. 6(a). The key code corresponding to the key that the user is pressing at that time is given in the key code area which has 7 bits. As long as the pressing operation of the key is being carried out, the area of the break flag is caused to be "0" as shown in FIG. 6(a).

In the second block (8 bits) the terminator code is set indicating the termination of the key being operated. Thus, it is possible to determine at the receiving side that the key which is currently being pressed down is only one key as indicated by the first block.

Moreover, in this case, the dummy code is set with respect to the third and fourth blocks (each having 8 bits) so that the excess (remaining) area of the data area A5 is filled.

While a key is being pressed down, the packets shown in FIG. 6(a) each including the data area A5 formed in a manner as stated above are repeated, and are continuously transmitted from the light emitting unit 11 of the IR keyboard 1.

When the user releases the key which has been pressed down, the break flag of the key code of the first block is caused to be "1" as shown in FIG. 6(b). Namely, the flag indicating the release of the key operation has been carried out is raised (set) to carry out transmission. When transmission by the data structure shown in FIG. 6(b) is completed, the IR keyboard completes the transmitting operation and waits (stands by) until the next key operation is carried out.

When a user simultaneously operates two keys, the key code with the break flag corresponding to the key which has been pressed down first is set with respect to the first block of the data area A5, and the key code with break code corresponding to the key which has been subsequently pressed down is set with respect to the second block. Then, the terminator code is set with respect to the succeeding (subsequent) third block, and dummy code is set with respect to the fourth block. Thus, packets each including the data area A5 formed in this way are continuously transmitted.

When three keys are simultaneously operated, key codes with break flags are set with respect to the first to third blocks in the order in which the keys have been pressed down. The terminator code is set with respect to the fourth block. In this case, no dummy code is provided since the first to fourth blocks are used by the key codes with break flags and the terminator code. Thus, packets each including the data area A5 formed in this way are continuously transmitted.

It is to be noted that when only one key has been released from the state where multiple keys are operated, the break flag of the key code in which the releasing of the key operation has been carried out is caused to be "1". Thereafter, the key code with the break flag is eliminated. Thus, transmission is continued in the state where terminator code is added to the key code with break flag in which key operation has not been yet released.

In a more practical sense, when only one key is released from the state where two keys have been simultaneously operated, there results the state where a single key is operated. Accordingly, transmission by packets including the data area A5 of the structure shown in FIG. 6(a) will be carried out.

In a manner as stated above, data areas A5 including combination of key code with break flag in which key code corresponding to the key which is pressed down is set and a terminator code is formed to transmit data in the packet form including these data areas A5.

The data structure which has been explained with reference to FIG. 6 is of the form wherein transmit data corresponding to a single key operation is completed in the 32-bit data area A5 within 1 packet. An approach may be employed to handle data area A5 ranging over multiple packets to thereby cope with simultaneous operation of a larger number of operation keys.

Figure 7:
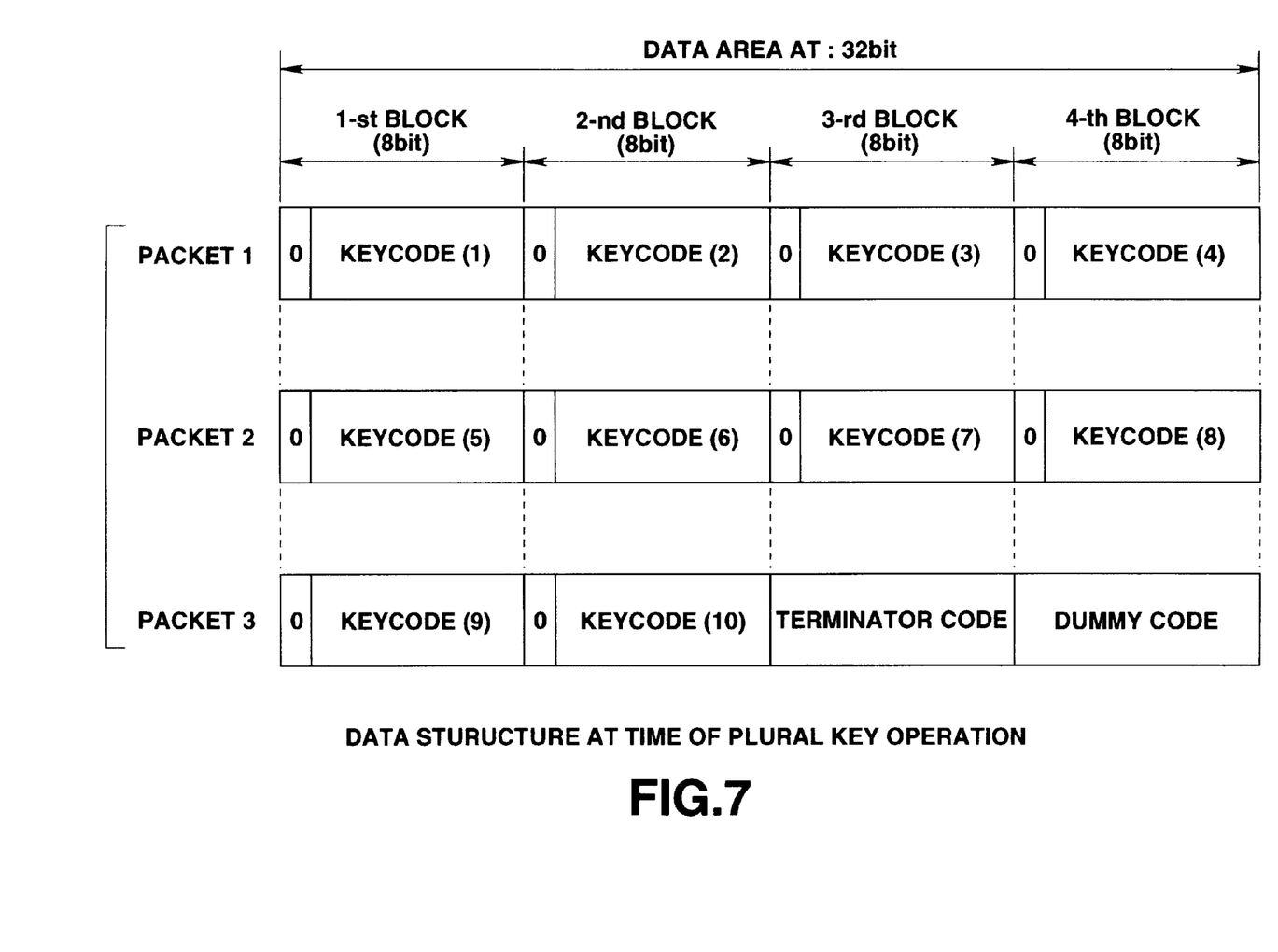
FIG. 7 is a view showing the data structure of a transmit signal when multiple keys are operated in the transmitting/receiving system.

As an example of such a case, FIG. 7 shows a more practical structure of transmitting data when ten (10) keys are simultaneously operated. It is to be noted that, in FIG. 7, only data area A5 of the data structure of each packet is shown.

FIG. 7 shows that the first thru the fourth block of the data area A5 in packet 1 are key codes (1) thru (4) with break flags. The first block to the fourth block of the data area correspond to the four keys which have been pressed down first to fourth of the simultaneously operated ten (10) keys.

With respect to the first block to the fourth block of the data area A5 in packet 2 transmitted subsequently to packet 1, key codes (5) through (8) with break flags correspond to the four keys which have been pressed down fifth to eighth. With respect to the first block and the second block of the data area A5 in packet 3 transmitted subsequent to packet 2, two key codes (9) and (10) with break flags have been pressed down ninth and tenth. With respect to the subsequent third block, a terminator code is set. The terminator code indicates that the key code (10) with break flag is the last key code of key codes corresponding to simultaneous operation. Thus, the receiving side can determine that key codes (1) thru (10) with break flags set in a manner ranging over packet 1 to packet 3 are key codes corresponding to keys which have been simultaneously operated.

A dummy code is provided at the fourth block since the fourth block of packet 3 is a remainder.

In FIG. 7, the data area of one set is formed by the data area A5 of three continuous packets (32 bits×3=96 bits). For the time period during which these ten (10) keys are operated, packet 1 thru packet 3 are repeatedly transmitted.

As stated above, the data areas A5 ranging over multiple packets are considered to be the data area of one set. Thus, the transmission format as described above has no limitation in the number of keys caused to undergo simultaneous operation which can be transmitted as the key code.

It is to be noted that when actual key input operation is taken into consideration, since use can simultaneously operate only ten (10) keys at the maximum even if he uses all fingers of the both hands, margin is given to the above-mentioned simultaneous key operation so that transmission of key codes corresponding to simultaneous operation of, e.g., 15 keys at the maximum can be made, and in the event that simultaneous operation of more than 15 keys is carried out, processing is assumed to be carried out such that key codes corresponding to the key operated sixteenth or keys operated subsequent thereto are not generated. In this case, the maximum number of bits which can be handled as a data area of one set obtained by connecting data areas A5 is defined as the number of bits corresponding to 4 packets as follows:

$$32 \text{ bits} \times 4 = 128 \text{ bits}$$

When the maximum number of bits is defined in this way, in the event that, e.g., 15 keys are simultaneously operated, key codes with break flags in which key codes of 15 keys are given are respectively assigned to the areas of 15 data blocks in total from the first packet up to the third block of the fourth packet, terminator code is set at the fourth block of the fourth packet. Thus, the data area formed by a total of 128 bits is completed.

In the case where only a certain key is released from the state where these large number of keys have been simultaneously operated, the break flag of the key code in which release of the key operation has been carried out is caused to be "1". Thereafter, this key code with break flag is removed, and terminator code is added to the last portion of the key code with break flag in which key operation is not still released. Thus, transmission is continued in such a state. The operation in connection with this point is similar to the operation previously described.

The receiving operation at the light receiving unit 2 side for receiving infrared ray signals transmitted from the IR keyboard 1 to execute required processing will now be described.

Figure 8:
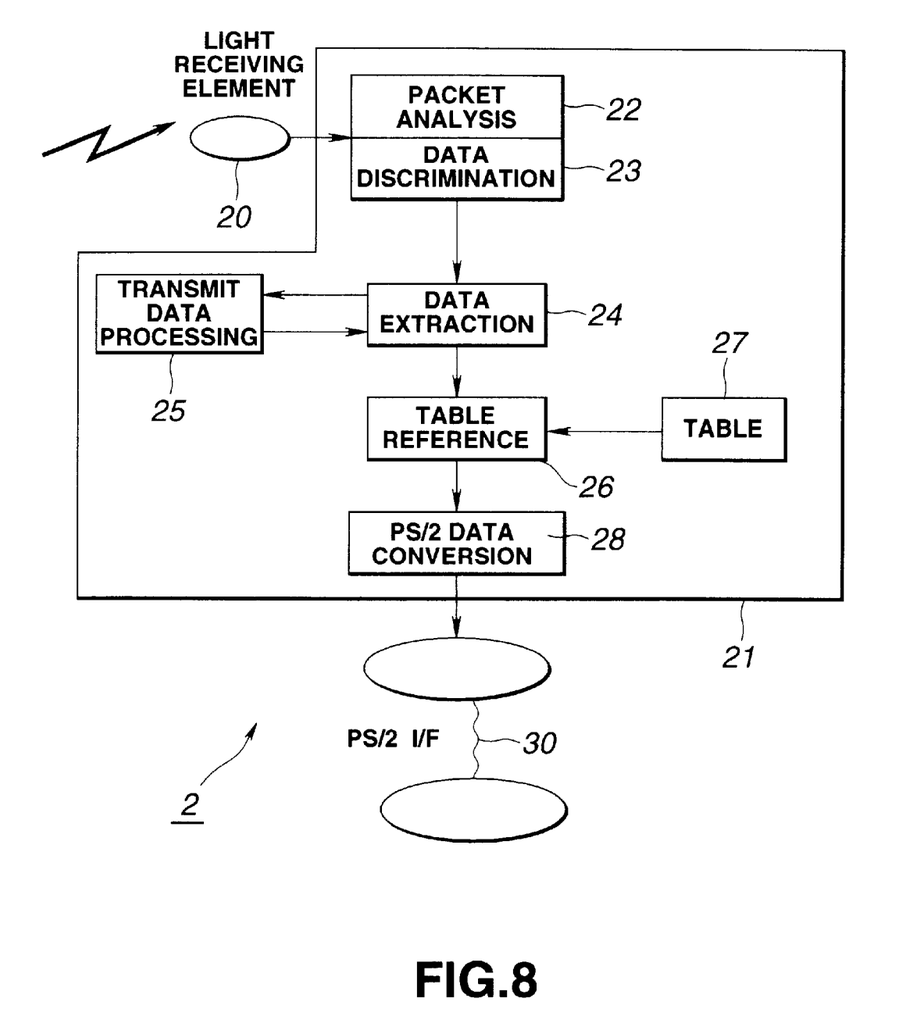
FIG. 8 is a block diagram showing the internal configuration of a light receiving unit serving as the receiving unit in the transmitting/receiving system.

The internal configuration of the light receiving unit 2 is shown in FIG. 8. The light receiving unit comprises a light receiving element 20 for receiving an infrared ray signal, and a control section 21 comprised of a one chip microcomputer for carrying out the required processing with respect to the infrared ray signal received by the light receiving element 20.

The control section 21 is comprised of a packet analysis section 22 supplied with the infrared ray signal received by the light receiving element 20, a data discriminating section 23 connected to the packet analysis section 22, a data extracting section 24 connected to the data discriminating section 23, a transmit data processing section 25 and a table reference processing section 26 which are connected to the data extracting section 24, and a data table 27 and a PS/2 data converting section 28 which are connected to the table reference processing section 26.

The packet analysis section 22 analyzes the data structure of a packet with respect to the infrared ray signal received by the light receiving element 20. The data discriminating section 23 discriminates data area A5 of the packet analyzed by the packet analysis section 22. The data extracting section 24 extracts the transmit data included in the data area A5 discriminated by the data discriminating section 23 to deliver the transmit data of 32 bits (=8 bits×4) to the table reference processing section 26. The transmit data processing section 25 carries out time-out processing with respect to the transmit data extracted by the data extracting section 24.

The table reference processing section 26 generates Make signal $S_M$ and Break signal $S_B$ by making reference to the data table 27 on the basis of the transmit data extracted by the data extracting section 24 to deliver, to the PS/2 data converting section 28, the Make signal $S_M$ and the Break signal $S_B$ along with key code data given as transmit data extracted by the data extracting section 24. The PS/2 data converting section 28 converts the key code data, the Make signal $S_M$ and the Break signal $S_B$ delivered from the table reference processing section 26 into a key operation information signal in conformity with the PS/2 format to deliver it to the computer unit 3 side through a PS/2 interface 30.

Figure 9:
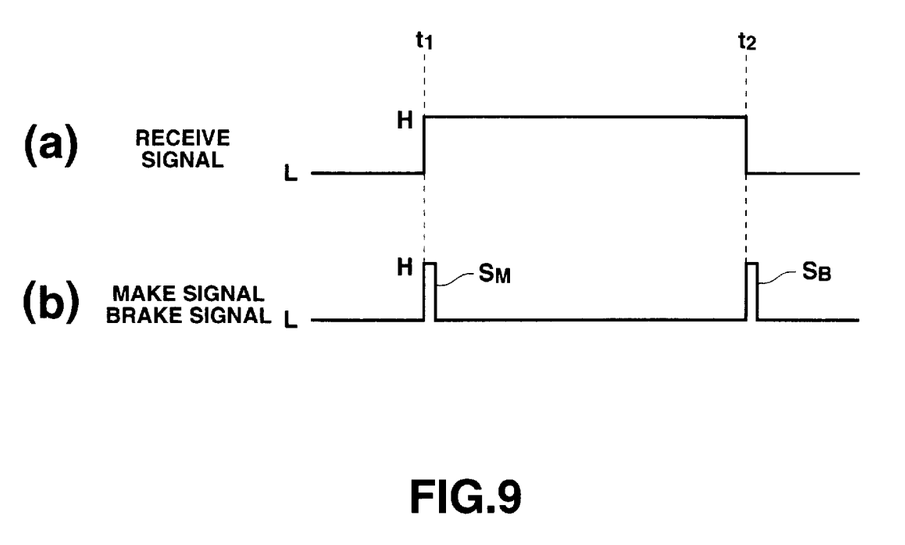
FIG. 9 is a timing chart showing an example of the normal operation of the light receiving unit.

FIG. 9 is a timing chart showing the ordinary operation at the time an infrared ray signal is received by the light receiving unit 2. A receive signal received at the light receiving unit 2 is shown in FIG. 9(a). In FIG. 9(a), the time period at the H level indicates the time during which the receive signal is being obtained by the light receiving unit 2. FIG. 9(b) shows the output timings of the Make signal $S_M$ and the Break signal $S_B$ of signals delivered from the light receiving unit 2 to the computer unit 3.

When the key operation by the IR keyboard 1 is started at time point $t_1$ as shown in FIG. 9(a) an infrared ray signal is transmitted. The control section 21 of the light receiving unit 2 detects the edge of the received infrared ray signal to generate a Make signal $S_M$ as shown at time point $t_1$ of FIG. 9(b) and delivers it to the computer unit 3. The Make signal $S_M$ is an information signal indicating that a transmission from the IR keyboard has started, i.e., the key pressing operation has started. After the Make signal $S_M$ is obtained, the computer unit 3 executes processing based on the key operation information delivered from the light receiving unit. In this example, key code data received at the light receiving unit 2 is decoded by the control section 21 of the light receiving unit 2, and is sent to the computer unit 3 as a key code signal after the Make signal $S_M$.

When the operation of the IR keyboard 1 which has been operated until now is released at time point $t_2$ so that the transmit signal is reasonably stopped, break flags of all the key codes transmitted from the IR keyboard 1 are caused to be "1" as previously described. Thereafter, transmission of the infrared ray signal is completed. Followed by this, as shown in FIG. 9(a), the receive signal which has been received at the light receiving unit 2 is caused to be at the L level.

The control section 21 of the light receiving unit 2 detects the edge when the receive signal changes to L level to output, as indicated by time point $t_2$ of FIG. 9(b), Break signal $S_B$ indicating that transmission of the infrared ray signal has been completed, i.e., the key pressing operation has been released. In other words, the control section 21 of the light receiving unit 2 outputs the Break signal $S_B$ when the transmission end is detected, break flag of the key code of the receive signal received before that time is caused to be "1".

The computer unit 3 operates so that when it receives a Break signal $S_B$, it judges the input operation by the keyboard has been completed and shifts to the next operation.

The operation which has been explained with reference to FIG. 9 mentioned above is the operation at the ordinary time when the transmit signal, i.e., infrared ray signal is reasonably transmitted. However, there is the possibility that when the infrared ray signal is transmitted, the receive signal cannot be obtained at the light receiving unit 2 side. Although the IR keyboard 1 may be transmitting the infrared ray signal, the transmission path of the infrared ray signal can be temporarily interrupted by disturbance due to incident light, etc. of other light sources., etc., or the passing of a human being or object, etc.

Figure 10:
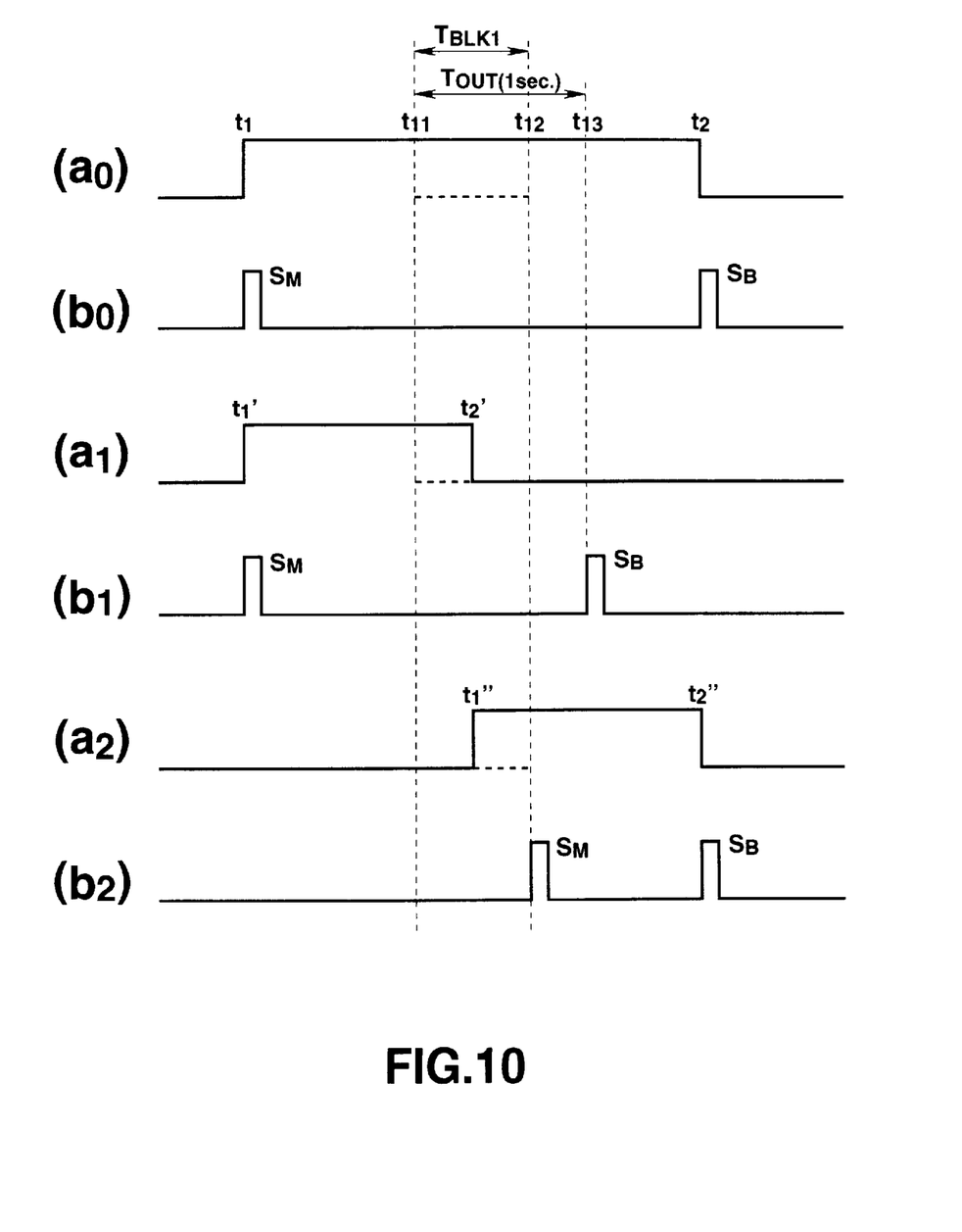
FIG. 10 is a timing chart showing an example of the operation of the light receiving unit when a disturbance takes place.
Figure 11:
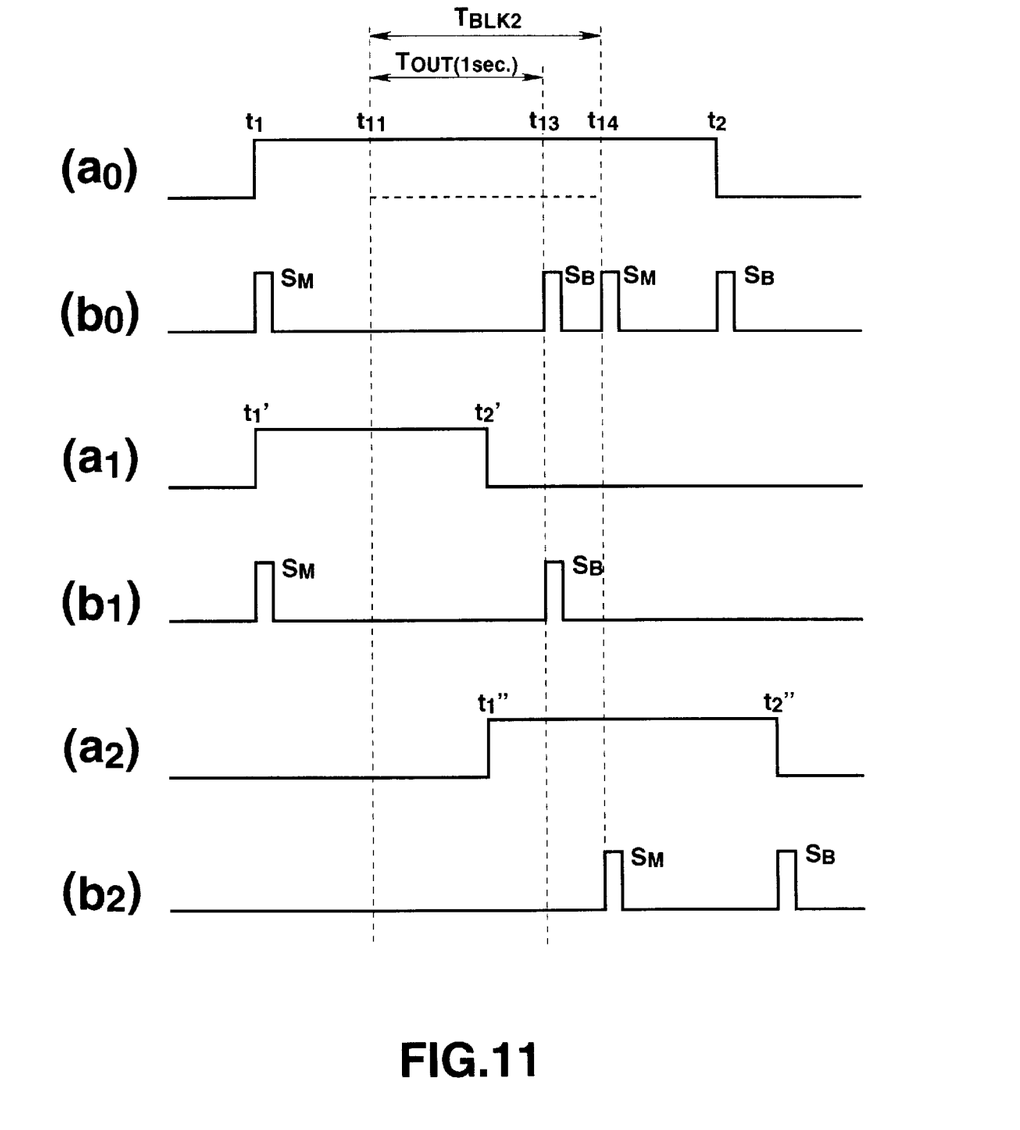
FIG. 11 is a timing chart showing another example of the operation of the light receiving unit when a disturbance takes place.

With reference of FIGS. 10 and 11 an explanation is given of an example of a disturbance of the infrared ray signal being transmitted to the light receiving unit 2.

FIG. 10 shows an example of when a disturbance takes place for a time period, $T_{BLK1}$ which is shorter than time $T_{OUT}$ (e.g., assumed to be 1 second in this example). $T_{OUT}$ is determined in accordance with the time-out processing by the transmit data processing section 25 in the control section 21 of the light receiving unit 2. The case where a disturbance takes place for a time period $T_{BLK2}$ longer than the time $T_{OUT}$ is shown in FIG. 11.

Receive signals received at the light receiving unit 2 are shown in FIGS. 10($a_0$), ($a_1$), ($a_2$) and FIGS. 11($a_0$), ($a_1$), ($a_2$), the time period of the H level indicates the time period during which the receive signal should be obtained by the light receiving unit 2. In addition, in FIGS. 10($b_0$), ($b_1$), ($b_2$) and FIGS. 11($b_0$), ($b_1$), ($b_2$), output timings of Make signal $S_M$ and Break signal $S_B$ of signals delivered from the light receiving unit 2 to the computer unit 3 are shown.

In this transmitting/receiving system, the light receiving unit 2 continuously operates to receive infrared ray signals when no disturbance takes place from time point $t_1$, when the key operation of the IR keyboard 1 is started, to time point $t_2$ when the key operation has been released. The solid lines from $t_1$ to $t_2$ in FIG. 10($a_0$) and 11 ($a_0$) represent the continuous transmission of the signal. The transmitting/receiving signal outputs a Make signal $S_M$ at the detection time point $t_1$ of the rising edge of the received infrared ray signal, and outputs Break signal $S_B$ at the receiving end time point $t_2$ of infrared ray signal when the break flag of the key code is set to "1" as shown in FIG. 10($b_0$) and FIG. 11($b_0$).

When the transmit signal is interrupted, although the transmission output is continued at the IR keyboard side, for any reason at time point $t_{11}$, the light receiving unit 2 fails to receive the transmitted signal. As a result, the receive signal changes to the L level as indicated by broken lines in FIG. 10($a_0$) and FIG. 11($a_0$).

In this case, the key code of the transmit signal which has been transmitted up to the time point $t_{11}$ is not completed. At the IR keyboard 1 side, the pressing operation of a key by a user is continued, and the signal transmission is continued. For this reason, the break flag is not set to "1" and attached to the key code of the receive signal received at the light receiving unit 2 up to the time point $t_{11}$. The break flag remains at "0". In other words, the flag indicating the release of the key is not set (raised).

In view of the above, the light receiving unit 2 continues to operate and when the receive unit fails to be obtained, the light receiving unit controls the data extracting section 24 by the transmit data processing section 25 connected to the data extracting section 24 and the Break signal $S_B$ is not outputted from the table reference processing section 26 at the time point $t_{11}$ when the receive signal is interrupted.

Thereafter, the transmit data processing section 25 carries out time-out processing to determine whether or not the receive signal is recovered within, e.g., 1 second from the time point $t_{11}$ when the receive signal is interrupted. When a disturbance is removed before one sec. has passed so that the receive signal is obtained as shown in FIG. 10($a_0$), the transmit data processing section 25 controls the data extracting section 24 so as not to output, even when the receive signal is newly obtained, Make signal $S_M$ at that time point, and to execute processing to output key operation information to the computer 3 on the basis of the received receive signal for a second time as it is.

In FIG. 10($a_0$), time point $t_{11}$ to time point $t_{13}$ indicates time period $T_{out}$ of 1 sec. prescribed by the time-out processing by the transmit data processing section 25. A recovery from a disturbance is made at time point $t_{12}$ which is less than 1 sec. from time point $t_{11}$ so the receive signal is obtained. When the receive signal is obtained for a second time at time point $t_{12}$ which is less than 1 sec. from time point $t_{11}$ at which transmit signal is interrupted so that there results an unreceivable state as stated above, the data extracting section 24 is controlled by the time-out processing by the transmit data processing section 25. The Break signal $S_B$ is ot outputted from the table reference processing section 26 at time point $t_{11}$ when the receive signal is interrupted and the Make signal $S_M$ is not outputted even if the receive signal is newly obtained at time point $t_{12}$.

Previously, since the break flag was not defined in the format of the transmit signal, when a receive signal was not obtained at the receiving side, the Break signal $S_B$ would be automatically outputted. For this reason, in the case where a disturbance is recovered at time point $t_{12}$ as shown in FIG. 10($a_0$) so that a receive signal can be obtained, Break signal $S_B$ is outputted at time point $t_{11}$, and Make signal $S_M$ is newly outputted at time point $t_{12}$.

In this case, at the computer unit 3 side, on the basis of the Break signal $S_B$ at time point $t_{11}$ and the Make signal $S_M$ at time point $t_{12}$, with respect to the receive signal before time point $t_{11}$ and the receive signal after time point $t_{12}$, they are assumed to be handed as receive signal corresponding to key operations different from each other to execute processing. In a more practical sense, consider when, e.g., the user operates the key marked "F". In such a case, this key operation is considered to be different key operation information before time point $t_{11}$ and after time point $t_{12}$. For this reason., one character "F" should be primarily inputted, but two characters "FF" are inputted. As a result, the user feels that an error in input unexpectedly takes place.

In the transmitting/receiving system to which this invention is applied, as has been explained with reference to FIGS. 10($a_0$) and ($b_0$), since the Break signal $S_B$ or the Make signal $S_M$ is not outputted at time point $t_{11}$ and time point $t_{12}$, the computer 3 side handles, as key code information corresponding to the same key operation, key code information obtained on the basis of receive signals before the time point $t_{11}$ and after the time point $t_{12}$. Namely, when a disturbance takes place for a time period of reception of infrared ray signal from time point $t_1$ to time point $t_2$, when its disturbance time $T_{BLK1}$ is assumed to be shorter than $T_{out}$ prescribed by the time-out processing by the transmit data processing section 25, the Make signal $S_M$ and the Break signal $S_B$ are outputted at the same timing as in the case where there is no disturbance as shown in FIG. 10($b_0$). Thus, in the case where, e.g., as described above, the user operates the key marked "F", a signal character of "F" is inputted as intended by the user. Accordingly, when the receive signal is momentarily interrupted, erroneous operation in regard to the key input can be reduced.

Moreover, in the case where the time point of completion of transmission of the infrared ray signal, i.e., the time point $t_2'$ of the falling edge of the receive signal in the light receiving unit 2 exists during the fault time $T_{BLK1}$, it is impossible to output Break signal $S_B$ at the time point $t_2'$ of the falling edge of the receive signal on the bases of the break flag "1" attached to the key code of the receive signal. Accordingly, the transmit data processing section 25 controls the data extracting section 24 so as to compulsorily output Break signal $S_B$ at the time point $t_{13}$ when the time $T_{OUT}$ prescribed by the time-out processing is passed as shown in FIG. 10($b_1$). Thus, the light receiving unit 2 outputs Make signal $S_M$ at detection time point $t_1$ of the rising edge of the received receive signal, and compulsorily outputs Break signal $S_B$ at the time point $t_{13}$ when the time $T_{OUT}$ prescribed by the time-out processing is passed. Accordingly, the computer unit 3 side handles, as key code information corresponding to the same key operation, key code obtained on the basis of the receive signal for a time period from the time point $t_1$ when the Make signal $S_M$ outputted from the light receiving unit 2 is outputted to the time point $t_{12}$ when the Break signal $S_B$ is outputted.

When the time point of the start of transmission of the infrared ray signal, i.e., the time point $t_1''$ of the rising edge of the receive signal in the light receiving unit 2 exists during the fault $T_{BLK1}$, it is impossible to output the Make signal $S_M$ at the time point $t_1''$ of the rising edge of the receive signal. Accordingly, the transmit data processing section 25 controls the data extracting section 24 of the receiving unit 2 so as to compulsorily output the make signal $S_M$ at the time point $t_{12}$ when recovery from the disturbance is established so that the receive signal can be obtained, as shown in FIG. 10($b_2$), without executing the time-out processing. Thus, the light receiving unit 2 outputs the Make signal $S_M$ at the time point $t_{12}$ when recovery from the disturbance is established so that the receive signal can be obtained to output the Break signal $S_B$ at the time point $t_2''$ of the falling edge of the receive signal on the basis of the break flag "1" attached to the key code of the receive signal. Accordingly, the computer unit 3 side handles, as key code information corresponding to the same key operation, the key code obtained on the basis of the receive signal for a time period from the time point $t_{12}$ when the Make signal $S_M$ outputted from the light receiving unit 2 is outputted to the time point $t_2''$ when the Break signal $S_B$ is outputted.

As stated above, the light receiving unit 2 does not output the Make signal $S_M$ or the Break signal $S_B$ during the disturbance time $T_{BLK1}$ with respect to the fault of time $T_{BLK1}$ shorter than the time $T_{OUT}$ prescribed in accordance with time-out processing by the transmit data processing section 25 of the control section 21.

When the disturbance takes place for a time period $T_{BLK2}$ which is longer than the time $T_{OUT}$, determined in accordance with the time-out processing by the transmit data processing section 25 of the control section 21 within the time during which the infrared ray signal is received, the data extracting section 24 is controlled to not output the Break signal $S_B$ from the table reference processing section 26 at the time point $t_{11}$ when the receive signal is interrupted, and to compulsorily output the Break signal $S_B$ in accordance with the time-out processing by the transmit data processing section 25.

In FIG. 11($a_0$), the time period from the time point $t_{11}$ to the time point $t_{13}$ indicates the time $T_{OUT}$ of 1 sec. which is determined in accordance with the time-out processing by the transmit data processing section 25. At time point $t_{14}$ which exceeds 1 sec. from time point $t_{11}$, recovery from a disturbance is established so that the receive signal can be obtained. When the receive signal is obtained for a second time as stated above at time point $t_{14}$, when more than 1 sec. is passed from the time point $t_{11}$ when the transmit signal is interrupted so that the there results unreceivable state, the data extracting section 24 is controlled in accordance with the time-out processing by the transmit data processing section 21 as shown in FIG. 11($b_0$). The Break signal $S_B$ is not outputted from the table reference processing section 26 at time point $t_{11}$ when the receive signal is interrupted and the Break signal $S_B$ is compulsorily outputted at time point $t_{13}$ when time $T_{OUT}$ of 1 sec., determined by the time-out processing, has passed from time point $t_{11}$. The receiving unit 2 outputs Make signal $S_M$ at the point $t_{14}$ when recovery from the disturbance is established so that the receive signal is newly obtained.

At time point $t_{11}$ in FIG. 11($a_0$), although the key pressing operation is carried out at the IR keyboard 1 side, the receive signal changes to the L level by the occurrence of a fault as indicated by the broken lines. However, at this time, the Break signal $S_B$ is not outputted from the light receiving unit 2. When recovery from a disturbance is not established and the receive signal is not obtained in the 1 sec. between time point $t_{11}$ and time point $t_{13}$, the Break signal $S_B$ is compulsorily outputted at time point $t_{13}$. When this Break signal $S_B$ is inputted, the computer unit 3 side considers that the key pressing operation corresponding to the key code of the receive signal earlier than the time $t_{11}$ is completed.

In this case, the user who is carrying out the operation feels that the time period during which interruption of the receive signal is continued for 1 sec. or more during the key operation is a considerably long time. For this reason, when interruption of the receive signal is continued for 1 sec. or more, the Break signal $S_B$ is outputted to deliver end information of key operation to the computer unit 3 side to thereby, e.g., exclude the cause of interruption of the transmit signal by user himself as occasion demands thereafter to promote him to carry out new key input operation. It is preferable to employ such a method for convenience of use.

Moreover, in the case where the time point of transmission end of the infrared ray signal, i.e., the time point $t_2'$ of the falling edge of the receive signal in the light receiving unit 2 exists during the fault time $T_{BLK2}$ as shown in FIG. 11($a_1$), it is impossible to output the Break signal $S_B$ at the time point $t_2'$ of the falling edge of the receive signal on the basis of the break flag "1" attached to the key code of the receive signal. Accordingly, the transmit data processing section 25 controls the data extracting section 24 so as to compulsorily output the Break signal $S_B$ at the time $t_{13}$ when the time $T_{OUT}$ prescribed by the time-out processing is passed as shown in FIG. 11($b_1$). Thus, the light receiving unit 2 outputs the make signal $S_M$ at the detection time point $t_1'$ of the rising edge of the received receive signal, and compulsorily outputs the Break signal $S_B$ at the time point $t_{13}$ when the time $T_{OUT}$ prescribed by the time-out processing is passed. Accordingly, the computer unit 3 side handles, as key code information corresponding to the same key operation, the key code obtained on the basis of the receive signal for a time period from the time point $t_1$ when the Make signal $S_M$ outputted from the light receiving unit 2 is outputted to the time point $t_{13}$ when the Break signal $S_B$ is outputted.

In this example, in the case where the time point of transmission start of the infrared ray signal, i.e., the time point $t_1''$ of the rising edge of the receive signal in the light receiving unit 2 exists during the fault time $T_{BLK2}$ as shown in FIG. 11($a_2$), it is impossible to output the Make signal $S_M$ at the time point $t_1''$ of the rising edge of the receive signal. Accordingly, the transmit data processing section 25 controls the data extracting section 24 of the receiving unit 2 so as to compulsorily output the Make signal $S_M$ at the time point $t_{14}$ when recovery from the fault is established so that the receive signal is obtained as shown in FIG. 11($b_2$) without executing the time-out processing. Thus, the light receiving unit 2 outputs the Make signal $S_M$ at the time point $t_{14}$ when recovery from the fault is established so that the receive signal is obtained to output Break signal $S_B$ at the time point $t_2''$ of the falling edge of the receive signal on the basis of the break flag "1" attached to the key code of the receive signal. Accordingly, the computer unit 3 side handles, as key code information corresponding to the same key operation, key code obtained on the basis of the receive signal for a time period from the point $t_{14}$ when the Make signal $S_M$ outputted from the light receiving unit 2 is outputted up to the time point $t_2''$ when the Break signal $S_B$ is outputted.

It is to be noted that in FIGS. 10 and 11 the time $T_{OUT}$ from interruption of the receive signal to the time point when the Break signal $S_B$ is compulsorily outputted is set to 1 sec. for illustrative purposes only. The time length which is considered to be most reasonable may be set depending upon the actual use conditions, etc.

Moreover, in implementing this invention, the transmission format transmitted in packet units shown in FIG. 4 is not necessarily required. For example, data of variable length consisting of key code with break flag and terminator code which correspond to the key caused to undergo pressing operation may be caused to be respective one sets to continuously transmit respective sets of data.

Further, the transmitting/receiving system to which this invention is applied is not limited to the configuration shown in FIG. 1. If a keyboard unit which can transmit key operation information by wireless means and a receiving system of a structure for receiving the transmit signal form the keyboard unit to execute required processing are provided, this invention can be applied to systems of other forms.

In addition, even if there is employed, as transmitting means provided in the keyboard unit, e.g., the configuration for carrying out transmission by radio wave, etc. except for infrared rays, this invention can be applied thereto. In this case, employment of the transmission format in which break flag is attached to the key code is effective in the break flag is attached to the key code is effective in the infrared ray transmission system in which there is high possibility that the transmit signal path is interrupted by the human being or object, etc.

As has been explained above, in accordance with this invention, a transmission format is used for transmitting, as key operation information of one set, a key code corresponding to one or multiple keys being operated and a terminator code provided at the last portion of the key code. In this case, use of such a format has the effect or merit that there is no limitation in (information of) the number of keys simultaneously operated which can be transmitted. For this reason, e.g., combined key operation, etc. which has not been put into practice can be made, thus permitting realization of wide variety of key operation forms by the keyboard.

In addition, in this invention, since a break flag is provided in the key code, it is possible to determine at the receiving unit side that a key operation has been released. For this reason, in the receiving unit, when the receive signal fails to be obtained, when the break flag indicates that the key is being operated, if such disturbance occurrence time is within a predetermined time, the break signal is not outputted to the computer unit side, thus making it possible to have a temporary interruption of the receive signal which is not considered to be the end of the key operation. This lowers the possibility of an erroneous operation at the computer unit side because of an interruption of the receive signal. As a result the transmitting/receiving system can tolerate interruption of a transmitted signal.

We claim:

1. A method for transmitting key operation information from a keyboard, the method comprising the steps of:

generating key code information corresponding to a key being operated;

adding break flag information to the key code information indicating the operation status of the key as either in an operation mode or an operation release mode;

adding terminator code information indicating that the key code information corresponding to a key being operated is completed to the last portion of the key code information to which the break flag information has been added; and transmitting the key operation information.

2. A method for transmitting key operation information according to claim 1, wherein the key operation information is transmitted in packet units.

3. A method for transmitting key operation information according to claim 2, wherein the key operation information includes code information of multiple keys being simultaneously operated and break flag information added to the respective key code information.

4. An, apparatus for transmitting key operation information comprising:

means for generating key operation information corresponding to a key operated;

means for adding break flag information indicating the operation status of the key as either in-operation or operation release;

means for adding terminator code information indicating that the key code information corresponding to key operation is completed to the last portion of the key code information to which the break flag information has been added; and transmitting means for transmitting, as a transmit signal, the key operation information generated by the key operation information generating means.

5. An apparatus for transmitting key operation information according to claim 4, wherein the transmitting means transmits the transmit signal as an infrared ray signal.

6. A transmitting/receiving system for key operation information comprising:

a transmitting unit for generating key code information corresponding to a key being operated;

means for adding break flag information indicating the operation status of the key means for adding terminator code information indicating that the key code information corresponding to key operation is completed to the last portion of the key code information to which the break flag information has been added;

means for transmitting the key operation information; and a receiving unit comprising means for receiving the key operation information transmitted from the transmitting unit, whereby the receiving unit conducts a control process when a receive signal stops being received when the break flag information added to the key code information included in a received signal indicates that the key is being operated, a clocking operation starts from the time point of occurrence of a disturbance and if a receive signal is obtained within a predetermined time, the receiving signal is considered to be continuously received.

7. A transmitting/receiving system for key operation information according to claim 6, wherein when the means for receiving the key operation information fails to obtain the receive signal before the time point when a predetermined time is passed by the clocking operation, it outputs a key operation end information signal indicating the end of a transmit signal corresponding to the key operation.

* * * * *

UNITED STATES PATENT AND TRADEMARK OFFICE
CERTIFICATE OF CORRECTION

PATENT NO. : 6,031,470

DATED : Feb. 29, 2000

INVENTOR(S) : Asari et al.

It is certified that error appears in the above-indentified patent and that said Letters Patent is hereby corrected as shown below:

On the title page, items

[22]    PCT Filed: May 9, 1997

[86]    PCT No. PCT/JP97/01574
                   § 371 Date: Jan 9, 1998
                   § 102(e) Date: Jan 9, 1998

[87]    PCT Pub. No. W09743706
                PCT Pub. Date: Nov. 20, 1997

Signed and Sealed this

Third Day of April, 2001

Attest:

NICHOLAS P. GODICI

Attesting Officer     Acting Director of the United States Patent and Trademark Office